(12) United States Patent
Garcia et al.

(10) Patent No.: US 11,250,470 B2
(45) Date of Patent: Feb. 15, 2022

(54) SYSTEM AND METHOD FOR MOTION ONSET CONSUMER FOCUS SUGGESTION

(71) Applicant: Harman International Industries, Incorporated, Stamford, CT (US)

(72) Inventors: Juan Garcia, Hoffman Estates, IL (US); Aleks Rozman, Lincolnwood, IL (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/005,403

(22) Filed: Aug. 28, 2020

(65) Prior Publication Data

US 2020/0394683 A1    Dec. 17, 2020

Related U.S. Application Data

(62) Division of application No. 15/670,049, filed on Aug. 7, 2017, now Pat. No. 10,783,558.

(51) Int. Cl.
*G06Q 30/02* (2012.01)
*H04N 5/232* (2006.01)
(Continued)

(52) U.S. Cl.
CPC ......... *G06Q 30/0265* (2013.01); *B60K 35/00* (2013.01); *B60K 37/04* (2013.01);
(Continued)

(58) Field of Classification Search
None
See application file for complete search history.

(56) References Cited

U.S. PATENT DOCUMENTS 6,922,138 B2 * 7/2005 Melvin ................. G06Q 30/02
                                                         340/438
8,461,971 B2   6/2013 Ohta et al.
(Continued)

FOREIGN PATENT DOCUMENTS

JP     2002104103 A    4/2002

OTHER PUBLICATIONS

• Alex Webb, "Smart Windshields Seen as the New Ad Billboards," available on Jan. 6, 2017, retrieved from https://www.ttnews.com/articles/smart-windshields-seen-new-ad-billboards (Year: 2017).*

(Continued)

*Primary Examiner* — Sam Refai
(74) *Attorney, Agent, or Firm* — Angela M. Brunetti

(57) ABSTRACT

A system and method for identifying content relevant to a vehicle occupant using a rotatably-mounted sensor in a field of view of the vehicle occupant. The rotatably-mounted sensor collects information and data from its surroundings. The information and data is processes to identify relevant content to be presented to the vehicle occupant. The rotatably-mounted sensor is configured to rotate in a manner that directs the occupants gaze in a direction of the relevant content being presented. The relevant content may be selected based on information that is known about the vehicle occupant, the vehicle location, the vehicle destination, the vehicle surroundings associated with the location and/or destination, and vendor relationships.

9 Claims, 16 Drawing Sheets

(51) Int. Cl.
  *G06K 9/00*    (2022.01)
  *B60R 1/00*    (2022.01)
  *G01C 21/36*   (2006.01)
  *B60K 37/04*   (2006.01)
  *B60K 37/06*   (2006.01)
  *B60K 35/00*   (2006.01)
  *G06F 3/16*    (2006.01)
  *G06F 3/01*    (2006.01)

(52) U.S. Cl.
  CPC .............. *B60K 37/06* (2013.01); *B60R 1/00* (2013.01); *G01C 21/3697* (2013.01); *G06K 9/00604* (2013.01); *G06K 9/00845* (2013.01); *G06Q 30/0226* (2013.01); *G06Q 30/0242* (2013.01); *H04N 5/23296* (2013.01); *B60K 2370/139* (2019.05); *B60K 2370/1529* (2019.05); *B60K 2370/177* (2019.05); *B60K 2370/193* (2019.05); *B60K 2370/194* (2019.05); *B60K 2370/21* (2019.05); *B60K 2370/334* (2019.05); *B60R 2300/207* (2013.01); *G06F 3/013* (2013.01); *G06F 3/16* (2013.01)

(56) References Cited

U.S. PATENT DOCUMENTS

2010/0222957 A1\* 9/2010 Ohta .................... B60K 35/00
                                                                          701/31.4
2016/0381292 A1   12/2016 Lu
2017/0329329 A1\* 11/2017 Kamhi ................ G05D 1/0061

OTHER PUBLICATIONS

Alex Webb, "Smart Windshields Seen as the New Ad Billboards," available on Jan. 6, 2017, retrieved from https://www.ttnew.com/articles/smart-windshields-seen-new-ad-billboards (Year 2017).

\* cited by examiner

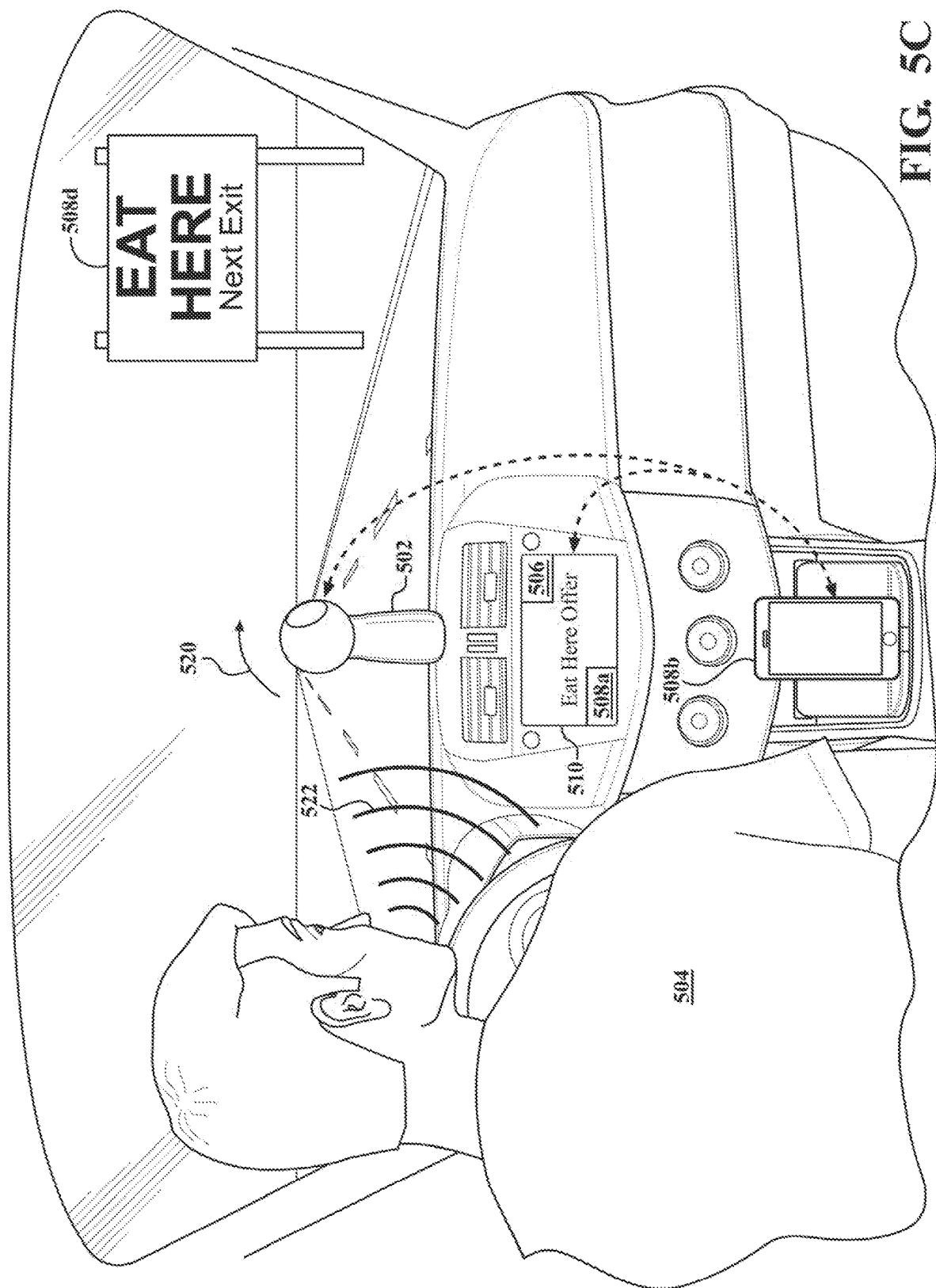

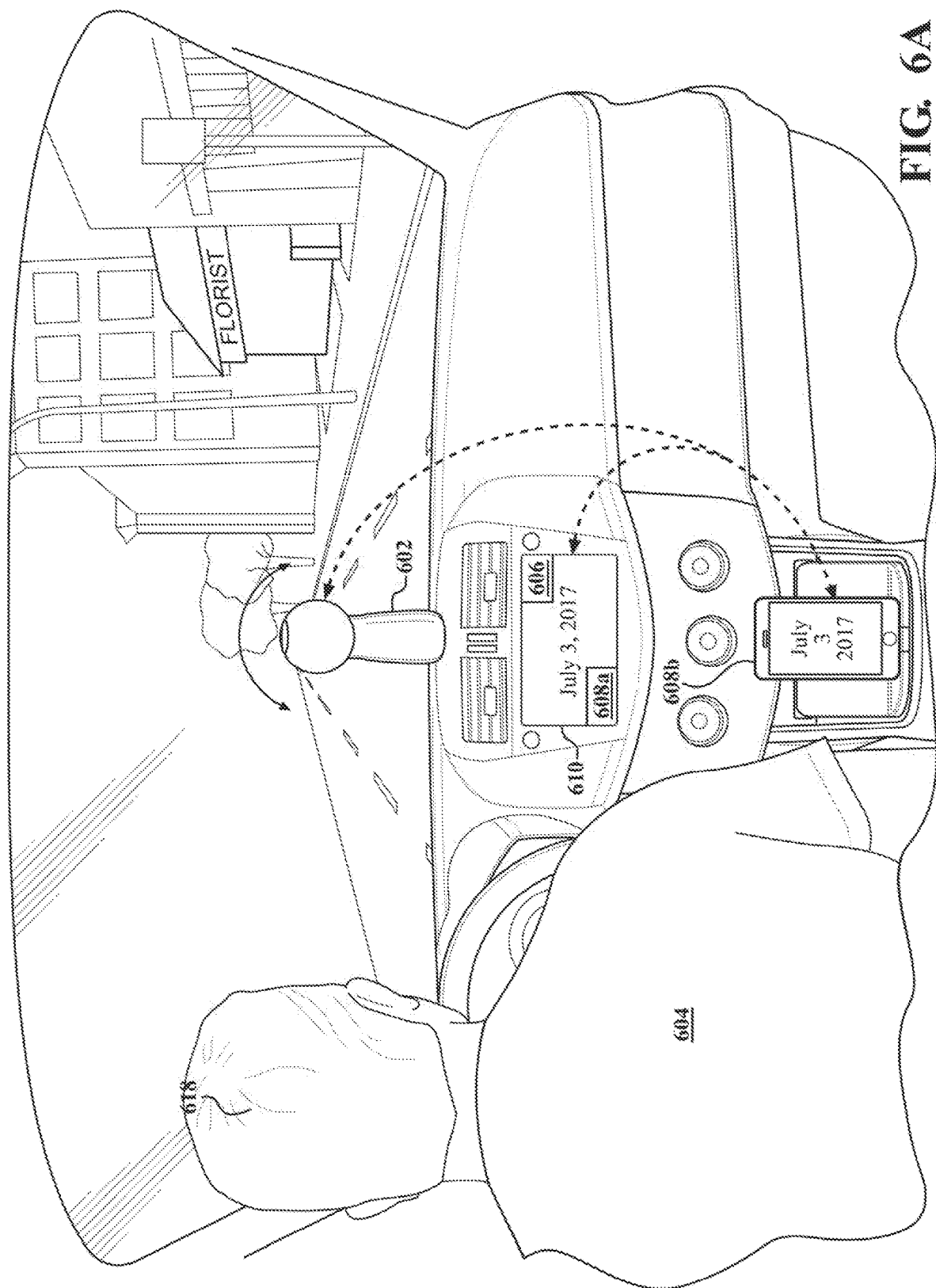

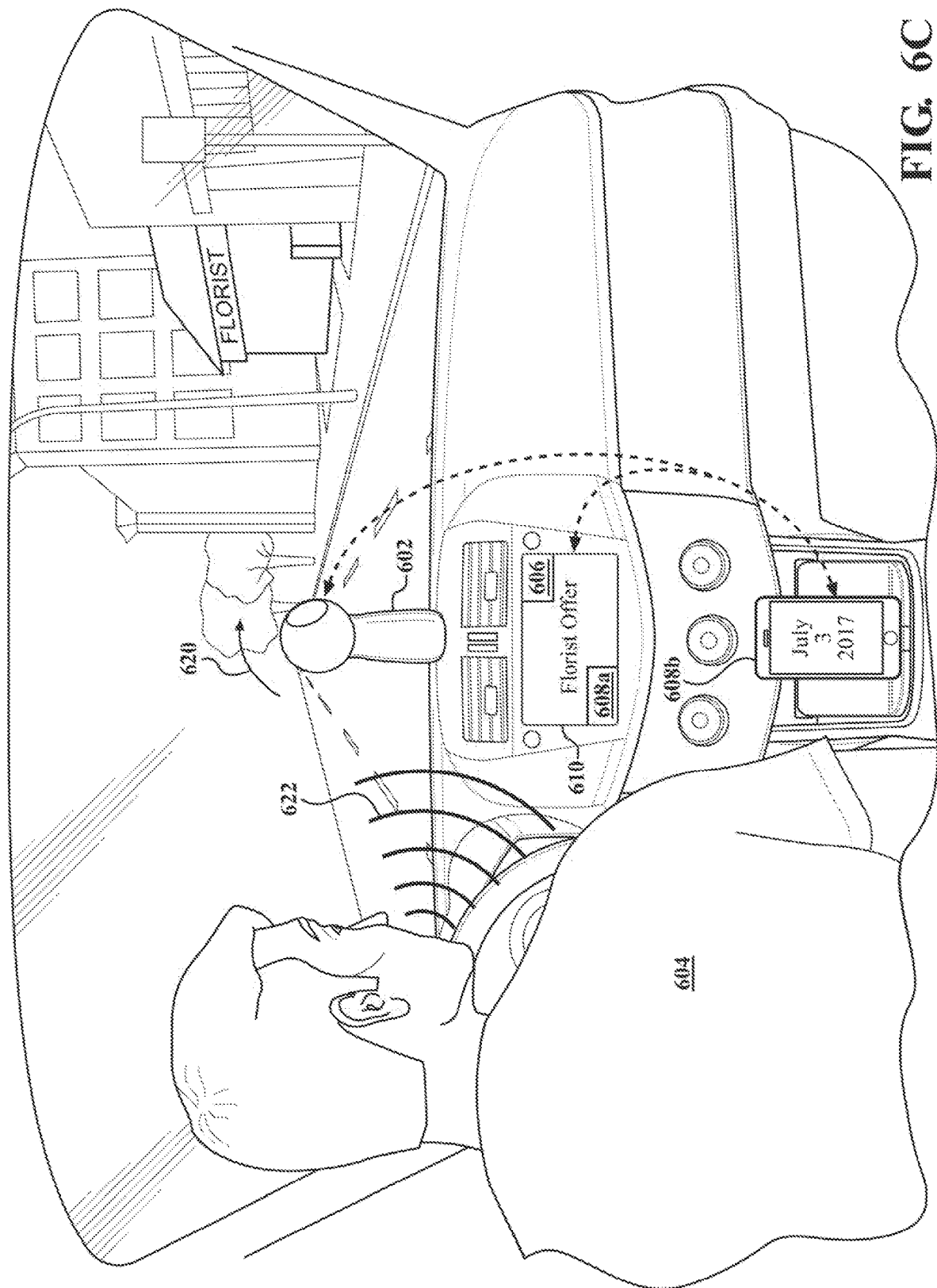

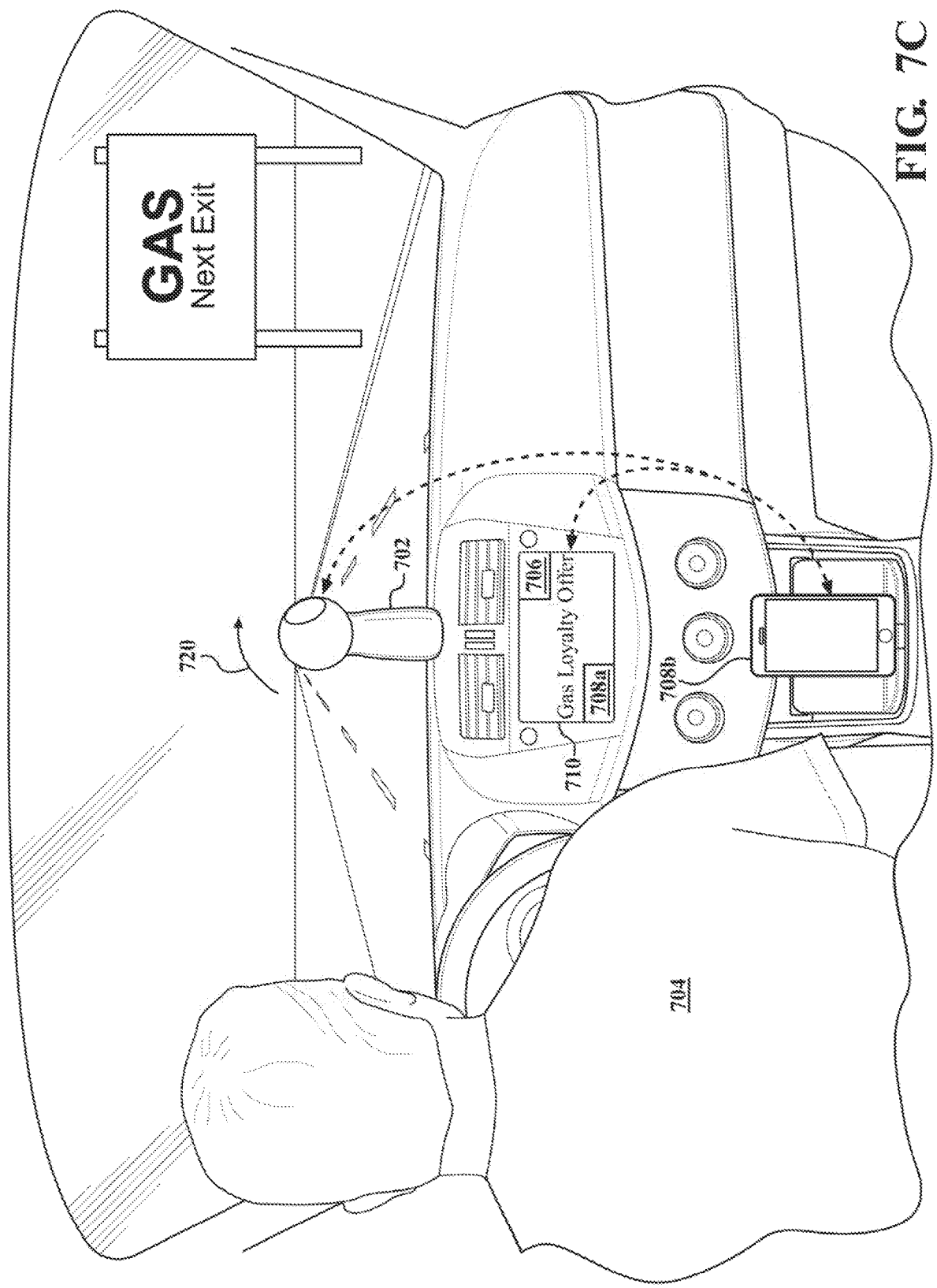

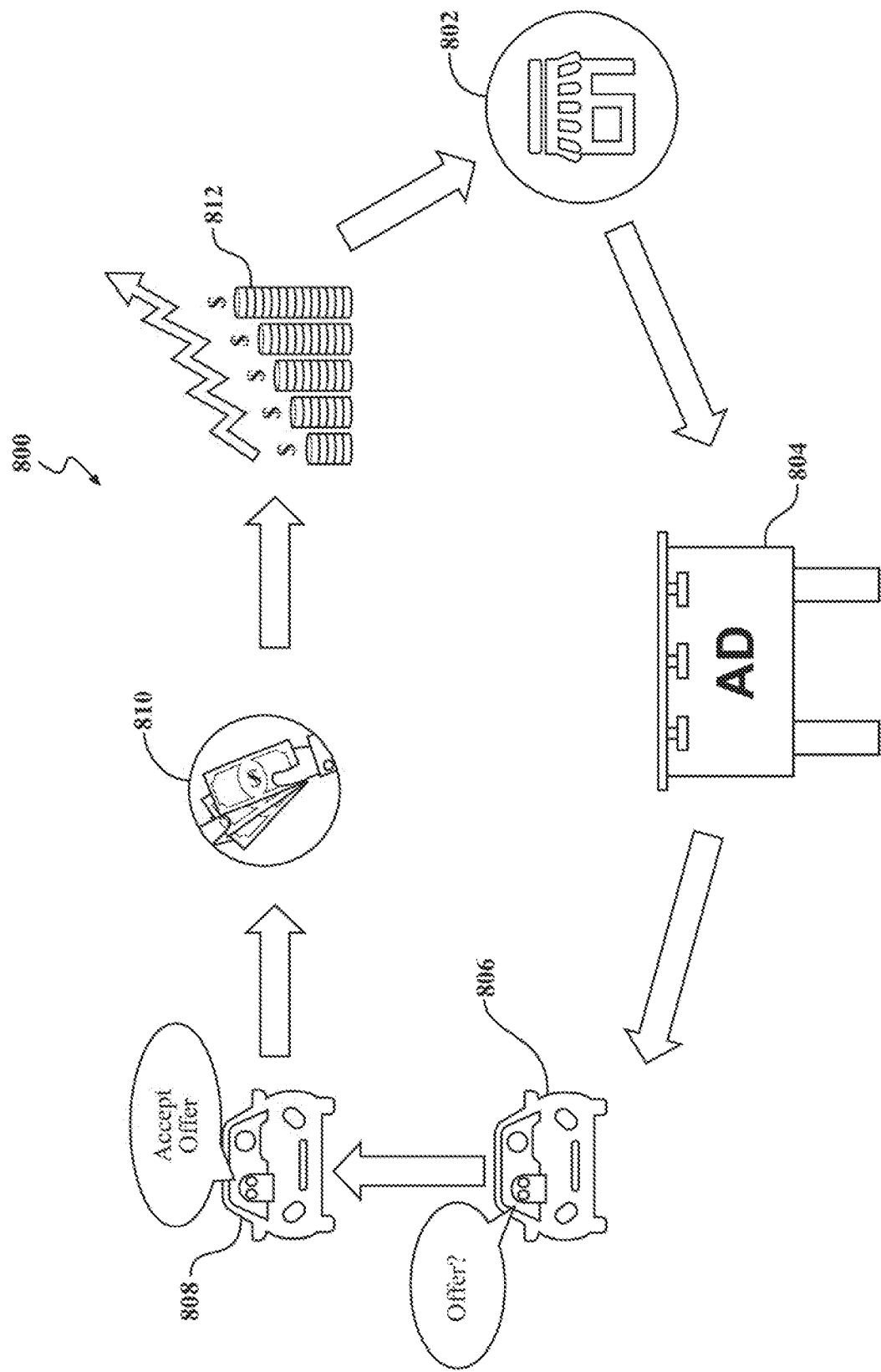

though the discussion is principally directed to advertising content, the description is not limited to the same and is applicable to any content that may be of interest to the vehicle occupant. The system 200 comprises a controller 206 configured with multiple connections that operate to receive and transmit information and data.

SYSTEM AND METHOD FOR MOTION ONSET CONSUMER FOCUS SUGGESTION

CROSS REFERENCE

This application is a divisional of co-pending U.S. application Ser. No. 15/670,049, filed on Aug. 7, 2017 and claims priority to application Ser. No. 15/670,049, filed Aug. 7, 2017, each of which is herein incorporated by reference.

TECHNICAL FIELD

The inventive subject matter is directed to a system and method for identifying and presenting content that may be relevant to an occupant in a vehicle.

BACKGROUND

As vehicles become more connected, a vehicle occupant, as a driver of or a passenger in a vehicle, has a desire to access information, or content, while commuting. The accessibility of so much content may lead to a distracted driver. A vehicle occupant, as a consumer, is also subject to many sources of advertising content that have become available in a connected vehicle environment. Furthermore, the connected vehicle has created a new platform to generate advertising revenue and for advertisers to present content to a vehicle occupant in a vehicle in ways that extend beyond typical radio advertisements. However, keeping in mind the desire to maintain safe driving habits by limiting driver distractions, there is a need to customize the content and attempt to match a vehicle occupant's interests with the content that is being presented. Also, when the vehicle occupant is a driver, a need arises to present the content in a manner that does not detract from the driver's attention to the road and driving capabilities.

SUMMARY

A system and method for identifying content relevant to a vehicle occupant using a rotatably-mounted sensor in a field of view of the vehicle occupant. The rotatably-mounted sensor collects information and data from its surroundings. The information and data is processes to identify relevant content to be presented to the vehicle occupant. The rotatably-mounted sensor is configured to rotate in a manner that directs the occupants gaze in a direction of the relevant content being presented. The relevant content may be selected based on information that is known about the vehicle occupant, the vehicle location, the vehicle destination, the vehicle surroundings associated with the location and/or destination, and vendor relationships.

DESCRIPTION OF DRAWINGS

FIGS. 5A-5C demonstrate an exemplary method;
FIGS. 6A-6C demonstrate an exemplary method;
FIGS. 7A-7C demonstrate an exemplary method;
and
FIG. 8 is a flow chart of an exemplary vendor relationship method.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DESCRIPTION OF INVENTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
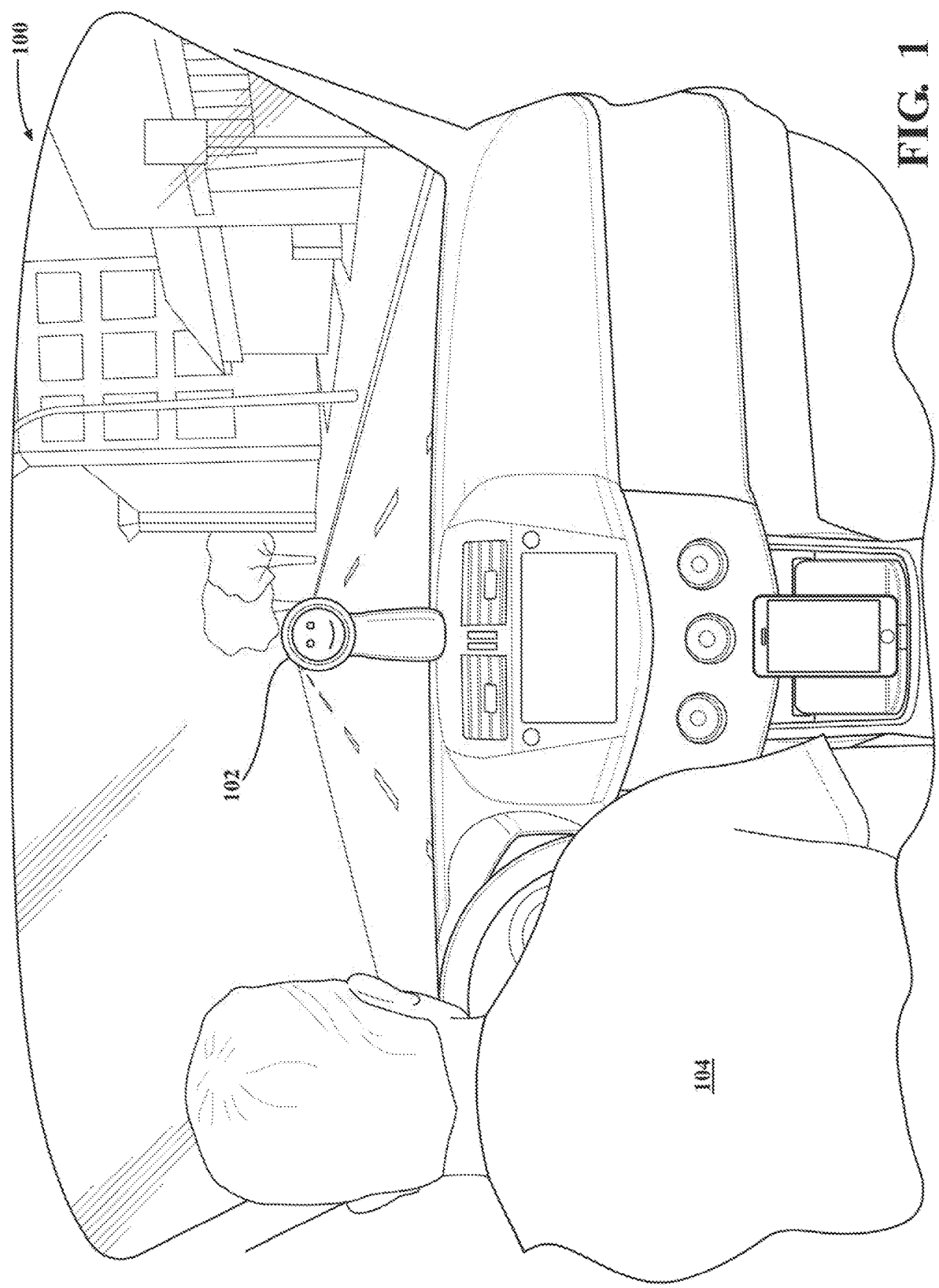
FIG. 1 is a perspective view of the system.

FIG. 1 is an illustration of a driver's view from inside a vehicle having a system 100 according to one or more embodiments. The system 100 has a rotatably-mounted sensor 102 on or about a vehicle, such as an automotive vehicle interior. The rotatably-mounted sensor 102 is within a field of view of a driver 104. The rotatably-mounted sensor 102 is in communication with a plurality of sources of content from its surroundings. The sources of content may be provided from sources both inside and outside of the vehicle. The rotatably-mounted sensor 102 may be a camera-based sensor that receives data, including visual data, from surroundings and has object detection capability. Visual data, along with data from other external sources is collected by the rotatably-mounted sensor 102 and communicated to a system controller (not shown in FIG. 1) to identify content that may be relevant to display or otherwise communicate to the driver 104. Once relevant content is identified by the system controller, the system controller controls a motion of the rotatably-mounted sensor 102 first in a direction that mildly draws the driver's 104 attention first to the sensor 102, such as meeting the driver's gaze, and second in a direction that corresponds with the location of the relevant content. The onset motion of the rotatably-mounted sensor 102 first gets the driver's attention and second, suggests to the driver that their gaze be drawn in a direction of the relevant content, thereby presenting the relevant content to the driver effectively and without driver distraction.

The system 100 analyzes and predicts the relevance of available content through processing information and data collected by the rotatably-mounted sensor 102. The system 100 presents the relevant content to the driver by controlling the rotatably-mounted sensor 102 and implementing eye focus suggestion through rotation of the rotatably-mounted sensor. A system controller 206 (shown in FIG. 2) instructs the rotatably-mounted sensor 202 to rotate in a direction of the content. Further, the system controller 206 may incorporate machine learning techniques and artificial intelligence learning algorithms to fine tune the abilities of the system 200 to predict and present content that is relevant to the driver's current needs and interests.

Figure 2:
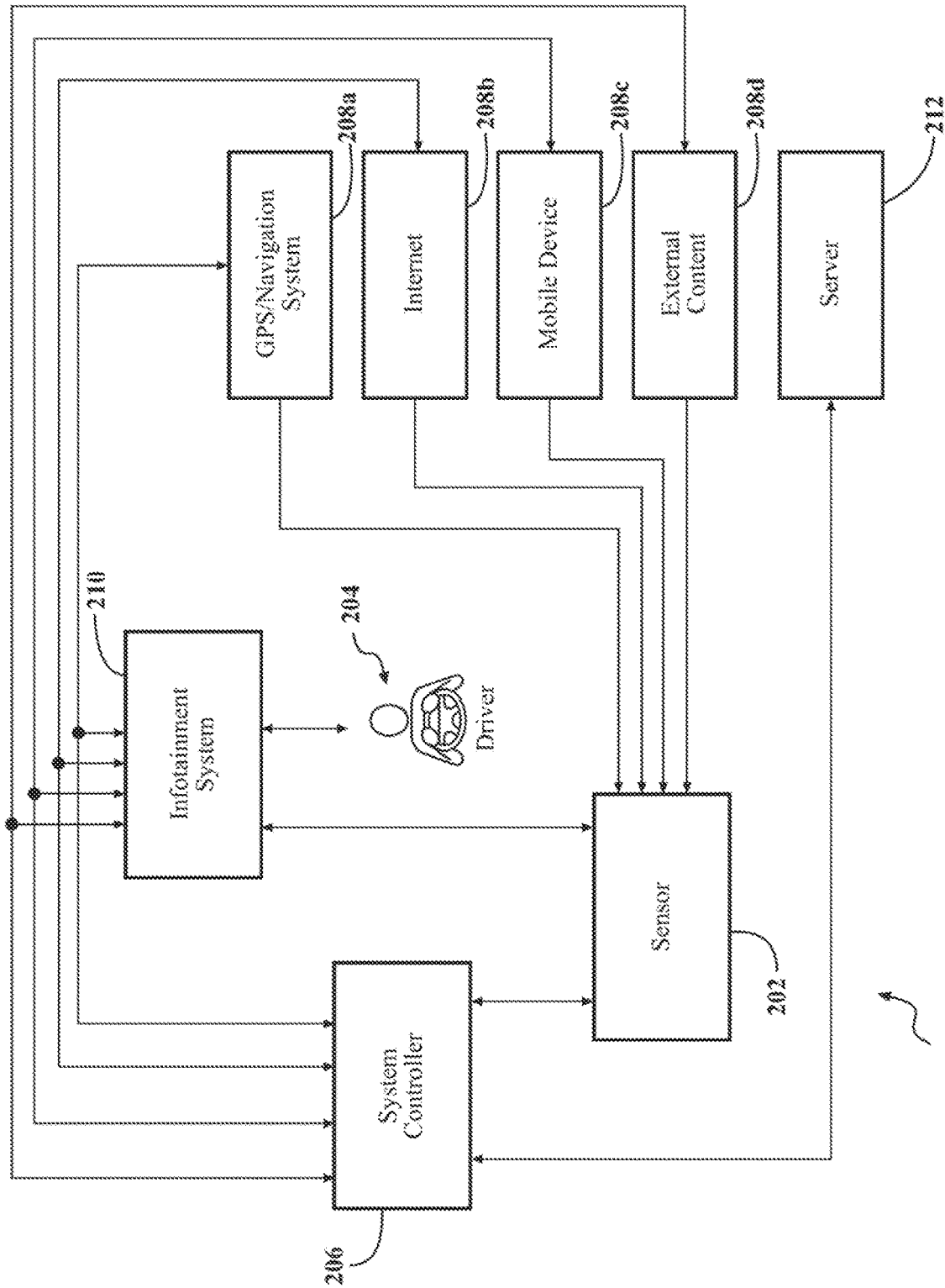
FIG. 2 is a block diagram of the system.

FIG. 2 is a block diagram of a system 200 for determining relevant content, selecting relevant content and presenting the selected relevant content to a vehicle occupant. It should be noted that while the description is presented in terms of the vehicle occupant being a driver of an automotive vehicle, the description is equally applicable to another type of occupant and another type of vehicle. For example, the vehicle occupant may be a passenger in an automobile. Or the vehicle may be something other than an automotive vehicle (i.e., a bicycle, or motorcycle,) and the vehicle occupant may be the driver or a passenger. In the present description the driver is being described for example purposes only. The rotatably-mounted sensor 202 and the driver 204 are within in view of each other. The driver 204 may make requests, (such as by verbal commands or through devices in the vehicle), for content from the system 200 as well as receive content, (audibly and visually), from the system 200. Furthermore, content may be presented to the driver whether or not the content is specifically requested by the driver 204.

A computing device, such as a system controller 206, which may include a computer processor having program logic to process data received, determines and selects relevant content, controls the presentation of determined relevant content output to a driver. The computing device also includes a memory module. The system controller 206 receives content, data and information being collected by the rotatably-mounted sensor 202. The rotatably-mounted sensor 202 is collecting content, data and information from a plurality of sources 208a-d. The plurality of sources may be directly or indirectly associated with the driver and may be communicatively connected to the rotatably-mounted sensor 202 or within a field of view of a camera that is part of the rotatably-mounted sensor and the driver. Data and information collected by the rotatably-mounted sensor 202 is used by the system controller 206 and processed to analyze and determine content that may be considered relevant to the driver. Upon determination of relevant content, the system controller 206 selects and presents the selected relevant content to the driver 204 and more specifically presents the relevant content to the driver through controlling a movement of the rotatably-mounted sensor 202.

The plurality of sources 208a-d that provide data and information to the rotatably-mounted sensor 202 may include, but are not limited to, a GPS/Navigation system 208a, an internet connection 208b, a mobile phone connection 208c, and external content 208d, such as billboard content, broadcast media/advertising content from sources outside of the vehicle, store front signage, street signage, or a database of media content stored in memory or otherwise accessed by the system controller 206. The sources 208a-d may themselves provide content. However, digital communication may be bi-directional between the sensor 202 and the source. For example, a digital billboard 208d will be in communication with the sensor 202 in the vehicle to present a tailored advertisement that matches an audio prompt within the vehicle.

The rotatably-mounted sensor 202 collects information about its surroundings and provides the information to the system controller 206. The rotatably-mounted sensor 202 may collect information from its surroundings using the sources 208a-d. For example, position information may include a current location of the vehicle, a location of a point of interest, a location of a potential point of interest, or a location of a point of interest that may be considered "of interest" to the driver based on information from the other sources 208a-d available to the sensor 202. The rotatably-mounted sensor 202 may be camera-based and use object detection to receive visual information from surroundings in its field of view, such as identifying store signage, street signage, objects, feedback from the driver's facial expressions etc.

Another source of content may include a server 212 external to the vehicle but accessible through communication connection such as wireless, cellular, Bluetooth, or other remote connection through the system controller 206. The server 212 may contain, or otherwise access, a database of advertisement content that is selected and presented to the driver 204 based on information and data collected by the sensor 202 and determined to be relevant to the driver. The content may be pre-determined content that is presented by an advertiser that has an agreement or arrangement, such as paid advertisements, with the vehicle manufacturer or other source and may present an opportunity for advertising revenue to be associated with a vehicle manufacturer and customized to be presented to an occupant in the vehicle.

The system controller 206 is also in communication with an infotainment system 210 in the vehicle. The infotainment system 210 is a collection of hardware and software in a vehicle that provides audio and/or video content to vehicle occupants. The hardware and software of the infotainment system 210 may include a display, audio system, or other interface system to present audio, video, and/or multimedia content to the driver 204 as directed by the system controller 206. The content available from the server 212 that is determined relevant to the driver may be uploaded to the infotainment system 210 based on information available from the other sources such as location, time of day, search history, calendar information and the object detection data collected at the rotatably-mounted sensor 202.

The system controller 206 may apply a relevance engine to the information and data collected by the rotatably-mounted sensor 202 and other sources 208a-d, 210, 212. The system controller 206, through program logic, applies a relevance criteria to the collected data and information to develop a score. Further, applying a threshold value to the score will result in the system controller 206 selecting relevant content and initiating instructions to rotate the rotatably-mounted sensor 202 as described hereinafter.

Figure 3:
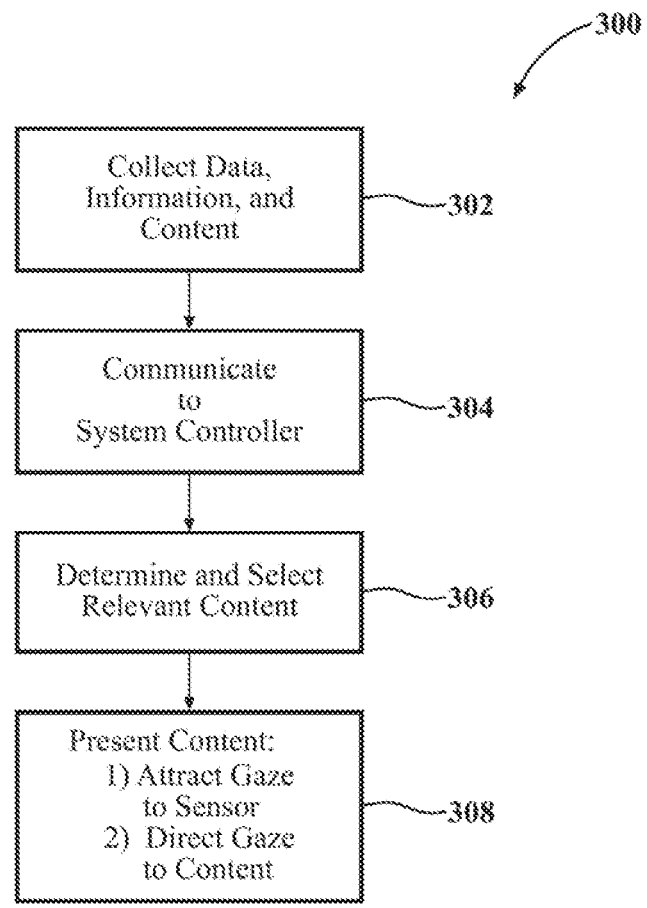
FIG. 3 is a flow chart of an exemplary method.

Referring to FIG. 3, a general flowchart of the system 300 is presented. The rotatably-mounted sensor collects 302 content, i.e., information, data, advertisements, offers, deals, etc. that may be supplied from several sources. The rotatably-mounted sensor communicates 304 the collected content, information and data to the system controller. The system controller processes 306 the content, information and data received from the sensor and determines 306 relevant content. Relevant content is content that is considered to be of interest to the driver based on their needs, preferences, and the data and information surrounding the driver collected by the sensor. The relevance criteria and application of the threshold the content considered to be most relevant to the driver is selected by the system controller. The selected relevant content is presented 308 to the driver in order to customize the content with information that is targeted specifically for the driver.

When collecting 302 content, the rotatably-mounted sensor, may be camera-based and therefore may use object detection to detect businesses, advertisers, etc. that are in a field of view of the rotatably-mounted sensor. Because the content collected by the rotatably-mounted sensor also includes driver specific information such as geographical location, time of day, calendar events, Internet search history, upcoming appointments, etc., the system controller is able to apply these factors in the determination and selection of 306 relevant content to present to the driver. Determining and selecting 306 relevant content may involve, for example, the system controller using a relevance engine to assign a relevance score to the collected data and information in order to determined relevant content. A threshold value may be applied to the relevance score and a relevance score that exceeds a predetermined threshold value is selected from the determined relevant content to be presented 308 to the driver. Further, the threshold value itself may be adjusted as a result of feedback received from the driver when the system presents what it deems to be selected relevant content based on criteria used in its algorithm. Such machine learning processes may be implemented to refine the system and optimize the content presented to the driver.

One method in which the relevant content is presented 308 to the driver may be by controlling onset movement of the rotatably-mounted sensor to suggest the driver focus their gaze in the rotatably-mounted sensor's direction of movement. The movement of the rotatably-mounted sensor suggests the driver's gaze first be drawn to the sensor. Once the sensor confirms that the driver is responding to the onset motion, the sensor rotates in a direction that draws the driver's gaze towards the relevant content, such as a physical store front or billboard. Additional content may be presented to the driver that is related to the store or billboard, in the form of media that is audible or visible to the driver through other devices, such as the vehicle's infotainment system or a mobile device.

Figure 4A:
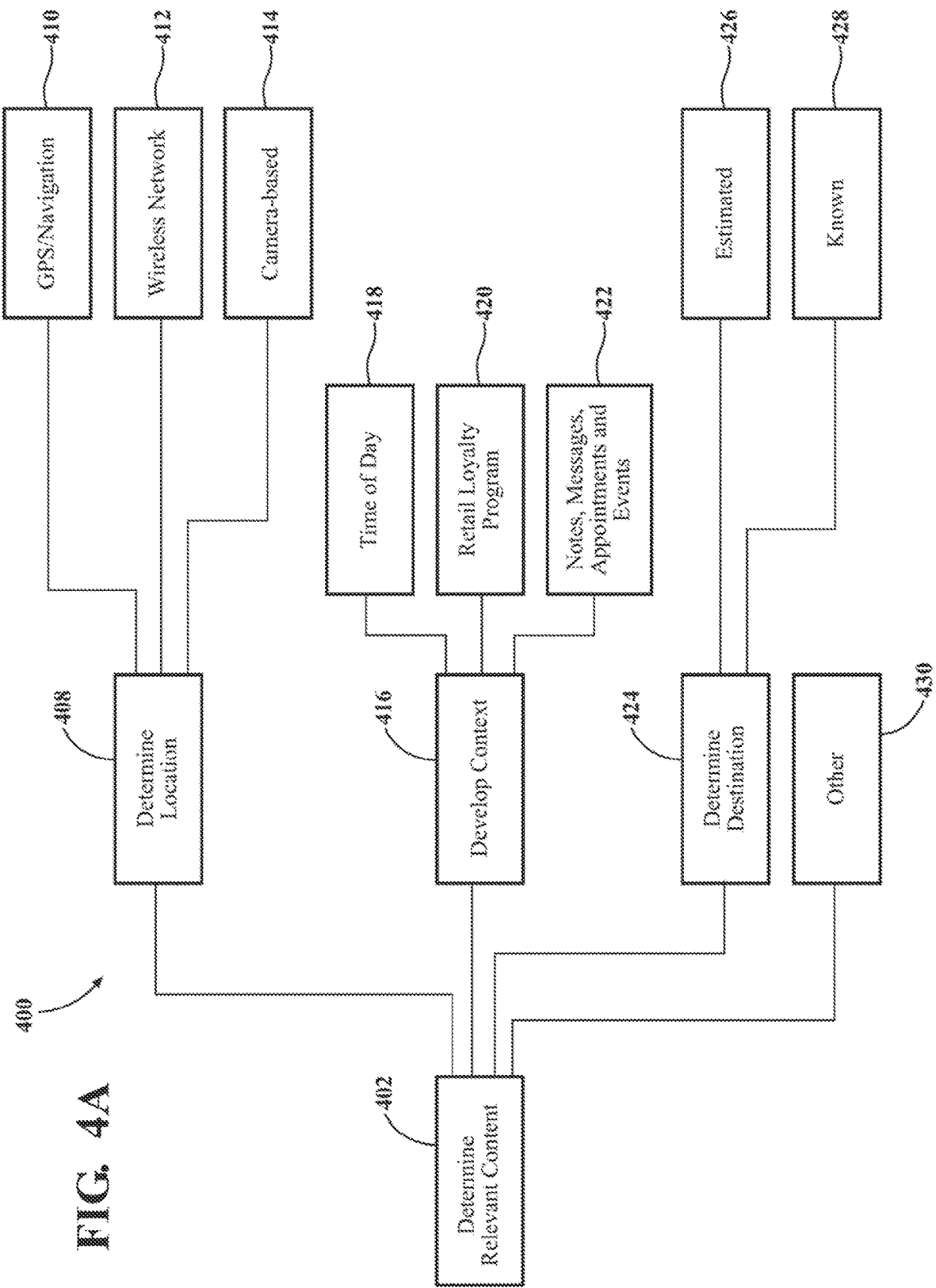
FIGS. 4A-C depict a detailed flow chart of an exemplary method.
Figure 4B:
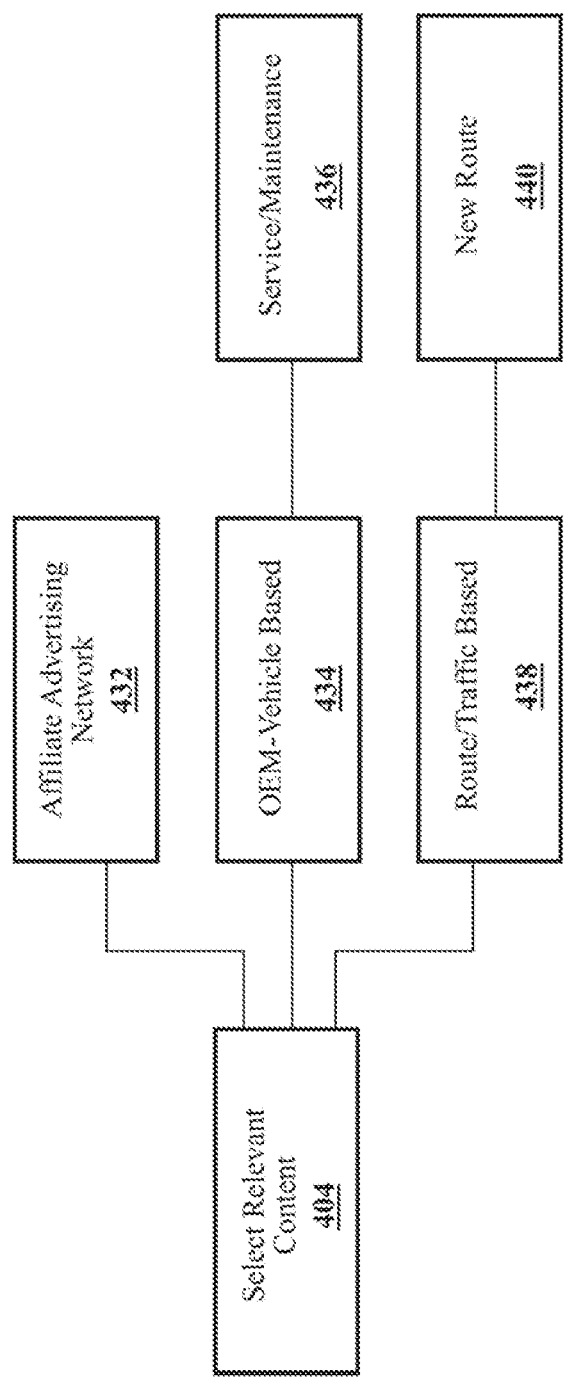
Figure 4C:
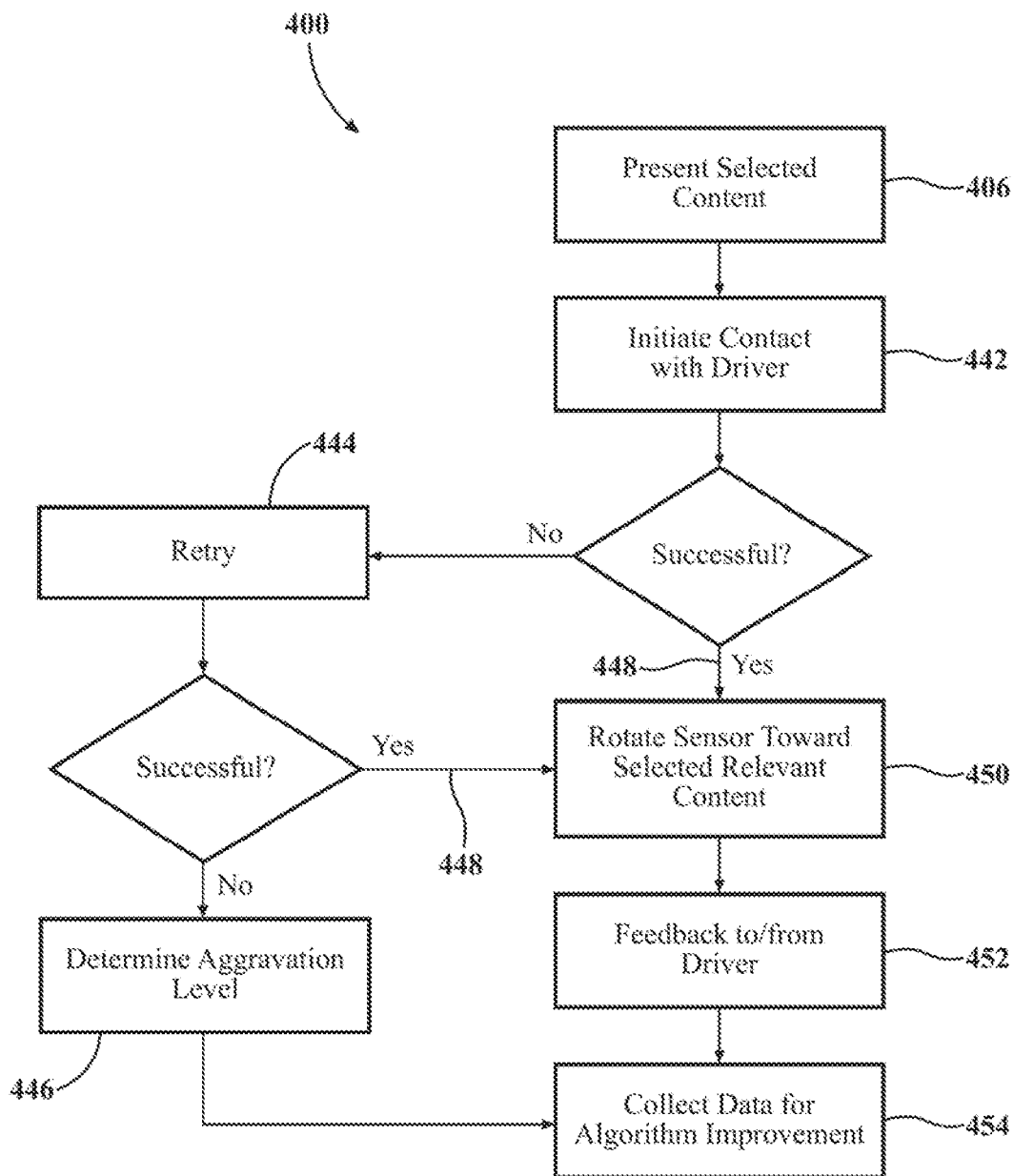

FIG. 4 presents a more detailed flowchart of a method 400 for consumer onset motion focus suggestion described herein. There are three general steps to the method 400 and each is presented in FIG. 4A-c. FIG. 4A depicts determining 402 content that is relevant to a vehicle occupant, such as the driver. FIG. 4B depicts selecting 404 relevant content to present to the driver. And FIG. 4C depicts presenting 406 the content to the driver.

Referring now to FIG. 4A, when determining content 402 that is relevant to the driver, the method 400 determines a location 408 of the driver. This may be accomplished by obtaining geographical location information 410 from a GPS/Navigation system or from the driver's mobile device. Alternatively, or in addition, the location of the driver may be determined by recognizing or detecting nearby wireless networks 412. Alternatively, or in addition, the driver's location may be determined by camera-based visual recognition of a location 414, such as by using the camera-based sensor's object detection capabilities and detecting street signs or other location identifying markers in an area.

In determining content 402 that is relevant to the driver, the method also develops a context 416 for the driver. The context is developed by looking to data that represents specifics about the driver's surroundings, events, messages to and from, and notes created or received by the driver. One or more sources may provide information and data used to set the context 416. For example, a time of day 418 may be determined from the vehicle's infotainment system, a clock internal to the sensor or system controller, a mobile device inside or connected to the vehicle's infotainment system. Setting the context 416 may also include applying knowledge of loyalty programs 420 that the driver is associated with, such as grocery stores, coffee shops, pharmacies, etc. This information may be stored, as in a database, in a memory of the controller and/or at a remote server, readily accessible by computer logic in the controller, or gleaned from the driver's mobile device. Additional information 422 to develop the driver's context 416 may be gleaned from the driver's mobile device such as from verbiage in text messages, calendar content such as upcoming appointments, events, birthdays or anniversaries. Additional information may also include notes stored on the mobile device. For example, the driver may have a received a message requesting they "pick up milk" on their way home or a "grocery list" stored in their notes.

Another factor that is considered in determining relevant content extends to the driver's destination 424. A destination may be estimated 426 from historical data from the GPS/Navigation of the vehicle or the driver's mobile device. A destination may be known or inferred 428 from a setting in the GPS/Navigation of the vehicle or the driver's mobile device. Additionally, there are many other factors 430 such as user input, feedback, collected as described later herein, etc. that may be used to determine driver-relevant content 402 and assign a threshold value to the relevant content which is described later herein with reference to FIG. 4B. The specific examples are too numerous to mention herein and one skilled in the art is capable of expanding the information and data that may be factored into the determination of driver-relevant content.

Referring now to FIG. 4B, a second step of the method 400 is selecting relevant content 404 to be presented to the driver. The selection of relevant content 404 may be qualified by applying outside factors such as affiliation with particular advertisers and advertising networks 432 to the data and information that is being collected by the sensor (as described in FIG. 4A and later herein. For example, if the method determines relevant content 402 based on a driver's loyalty programs with particular retailers, and one retailer in particular has a specific offer for the driver based on their value as a shopper, the system may select 404 the content specific to that particular advertiser and the offer customized by that advertiser for the driver as selected relevant content to be presented to the driver. Alternatively, a retailer with an offer for the driver may be detected by the driver's frequent travel in the vicinity of the business, or gleaned from a search history in their mobile device. In this regard, the retailer may have an offer to extend to the driver to lure them to their retail space or services, in which case the specific content is selected 404 to be presented to the driver. In another aspect, the knowledge of the driver's association with a specific retailer's loyalty program may initiate competing loyalty programs to extend offers to the driver which may then be selected 404 to be presented to the driver.

In another example, OEM vehicle-based information 434 taken from the vehicle itself may indicate that the vehicle is due for service or maintenance 436 based on the sensed vehicle-based content. For example, a low gas level, a low tire pressure, an indicator that maintenance such as an oil change or tire rotation is due, knowledge of a particular make/model/year of the vehicle's manufacture, or an affiliation with a local dealership that carries the make/model of the vehicle may provide content offering a special or the ability to set up a service appointment, which would result in the method 400 selecting specific content 404 associated with the OEM vehicle-based content 434.

Another example would be content that may alter the GPS/navigation estimated destination or current route guidance 438. For example, a traffic incident or construction on a route may prompt a route change 440 and therefore, different content to be selected 404 for presentation to the driver to give the driver content that is relevant to bypass the incident or location under construction or present content that is relevant to the new route.

FIG. 4C depicts the third step of the method 400, presenting the selected relevant content 406 to the driver. Presenting selected relevant content 406 to the driver occurs once relevant content is determined 402 and selected 404 for presentation to the driver. The method 400 initiates contact 442 with the driver by rotating the sensor in a direction to capture the driver's gaze and thereby, the driver's attention. Initiating contact with the driver through attracting the drier's gaze may include the onset motion, the onset motion accompanied by an audible sound such as a beep, or a verbal command or message from the system within the vehicle, or a verbal command or message from a system outside of the vehicle, such as the source of the selected relevant content to be presented.

In the event that contact with the driver is unsuccessful, another attempt is made 444. In the event the additional attempt at contact is unsuccessful, a check is performed 446 for an aggravation threshold for the driver. The result of the check is stored for future reference and to learn preferences and make adjustments that suit a particular driver. The aggravation threshold may be determined, for example, by the sensor from feedback received by the driver's facial expression, tone in their voice, or direct verbal reply from the driver.

Once successful contact is verified 448 the system controller rotates the sensor in a direction of the relevant content 450. The onset motion of the rotation of the sensor suggests the driver focus their attention in the direction of the sensor's rotation, which coincides with the direction of the relevant content being presented to the driver. Additionally, the sensor senses feedback from the driver and provides feedback to the driver 448 to reflect the accuracy of the determination 402, selection 404 and presentation 406 of relevant content. For example, in the event the driver acknowledges the relevant content, the sensor provides an output 450 that it recognizes the driver's interest in the content, "Yay, I'm happy I suggested something that you like". The sensor also collects this data 454 for the system controller to use in future reference and to learn preferences and make adjustments that suit a particular driver. Alternatively, in the event the driver ignores the relevant content or expresses disinterest, the sensor may provide an output 452 that it recognizes the driver's disinterest in the content, "I'm sad I wasted your time. I will remember this for the future".

The sensor and system controller collect data 454 from the driver's responses and customizes the collection, determination and presentation of relevant content to improve the method 400 through artificial intelligence or machine learning methods. The sensor and system controller become akin to a personal digital assistant to the driver. Collecting 454 the driver's responses or reactions to the presentation of relevant data will allow the method 400 to adjust the determination of relevant content in a manner that causes the method to hone in on relevant data choices 456. Further, the method 400 may determine the driver's preferred method of gaining attention. For example, eye contact alone, eye contact with a beep or tone from the sensor, eye contact with a verbal message such as "hey" or "hello", eye contact with a physical motion, such as a vibration or wiggle associated with the sensor. Communication styles 462. Frequency of presentation of content for advertisements and utilities.

The sensor and system controller collect data 454 to assess the driver's responses and modify the system's collection, decision making and presentation of relevant content to the driver in such a way as to optimize the system for a particular driver to reduce negative responses from the driver upon presentation of what the system considers to be relevant content. This collected data is used again to improve the determination 402 and selection 404 of relevant content by learning reactions, preferences, etc. from the collection, presentation and responses to the relevant content. The rotatably-mounted sensor has the capability to learn from the driver's reactions and modify the system to adjust to the driver's preferences. If the driver's response is negative, the system collects that information and adjusts the way it determines and selects relevant content by making adjustments to the threshold.

Figure 5A:
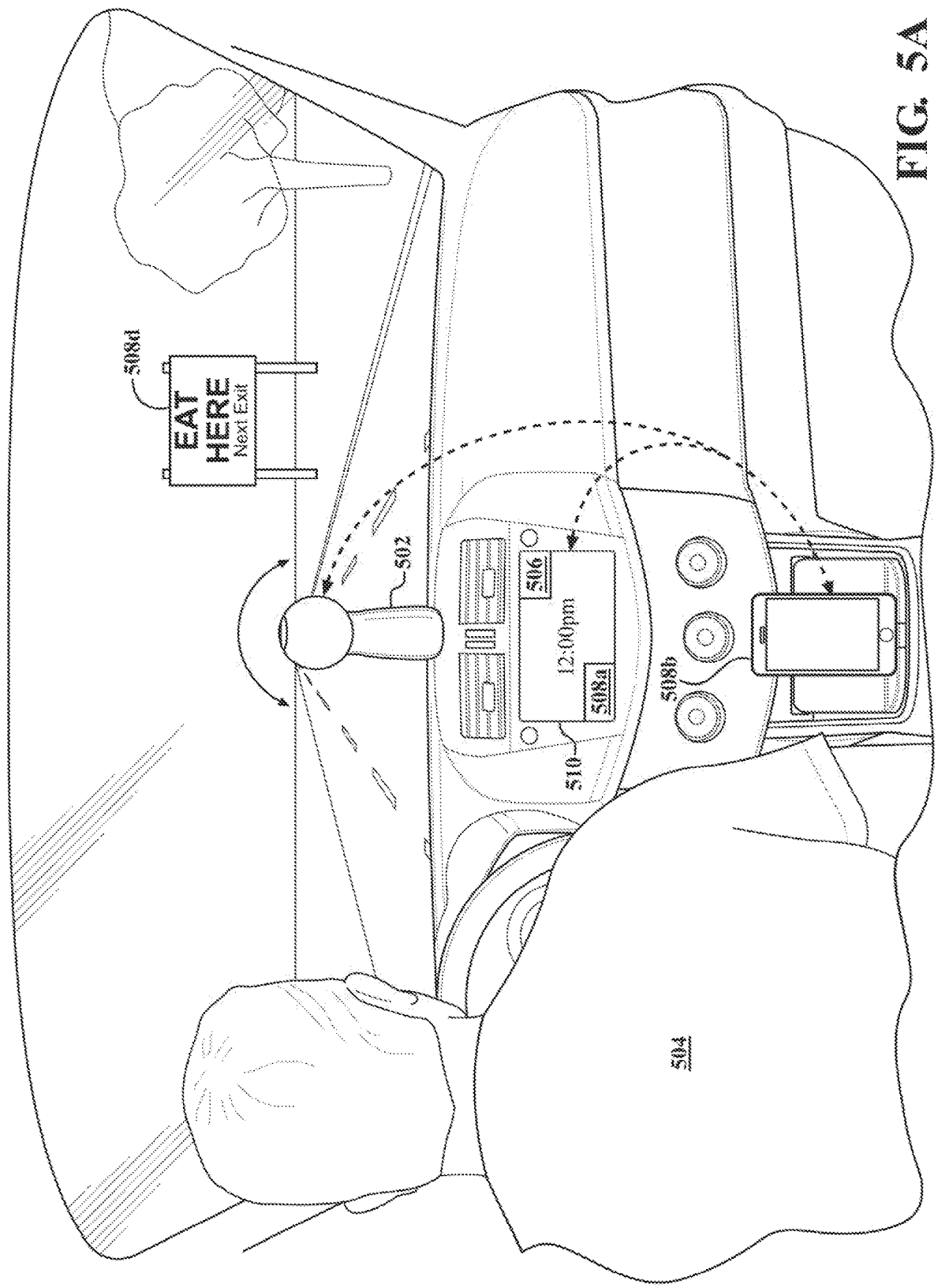

Several example implementations are provided herein. It should be noted that the implementations described herein are for example purposes only and in no way limit the application of the inventive subject matter to the examples illustrated herein. One example implementation is described with reference to FIGS. 5A-5C. In FIG. 5A, the rotatably-mounted sensor 502, being in communication with the infotainment system 510 or the driver's mobile phone 508b may collect data relating to the time of day and its surroundings by scanning. So at or around lunch time, the rotatably-mounted sensor may detect an external source 508d, such as a billboard display for a nearby restaurant. The GPS/Navigation system 508a may provide location data to the rotatably-mounted sensor 502, and the mobile phone 508b may be a conduit for a wireless or Internet connection to provide the rotatably-mounted sensor and/or the Infotainment system 510 with data relating to deals or specials that are currently being offered by the restaurant. All of this information may be collected by the rotatably-mounted sensor 502, communicated and processed at the system controller 506, and an output is provided to the driver 504.

Figure 5B:
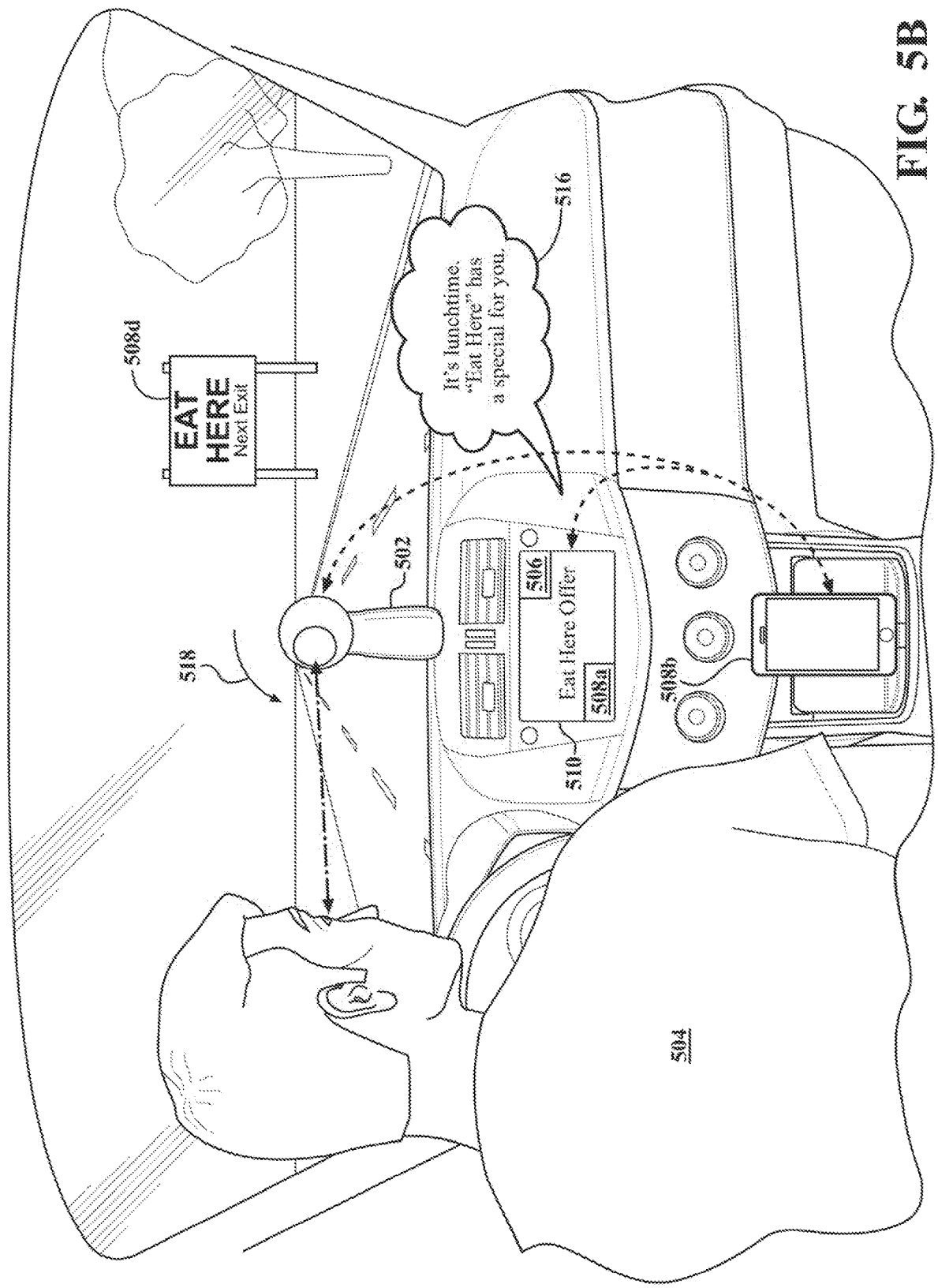

Referring now to FIG. 5B, the system controller 506 may first control the rotatably-mounted sensor 502 to rotate in a direction that attracts the attention of the driver 504 through a quick glance from the driver, with minimal distraction to the driver. Upon controlling the rotatably-mounted sensor 502 first to rotate in a direction 518 that attracts the attention of the driver, such as by making fleeting "eye contact" with the driver 502. Referring now to FIG. 5C, the system controller 506 then causes the sensor to rotate in a direction 520 of the billboard. The driver's gaze is naturally drawn in the direction 520 that the rotatably-mounted sensor 502 is being rotated, thereby drawing the driver's attention to the relevant content on the billboard. Furthermore, the infotainment system 510 may be controlled by the system controller 506 to present audio, video, or multimedia content 516 describing any special offers or deals that are currently being presented by the restaurant for the driver's benefit.

The driver may communicate with the system controller 506 and rotatably-mounted sensor 502, such as by verbal command 522, to express interest or disinterest (which may be direct or inferred by the driver's reaction as noted by the sensor). The driver may instruct the system controller to command the rotatably-mounted sensor, GPS/Navigation system 508a, or mobile phone 508b to contact the restaurant and express their interest in the restaurant's offer 516. For example, the GPS/Navigation 508a may provide instructions to the restaurant through the infotainment system to direct the driver to the restaurant. Or the mobile phone 508b may be instructed to place a call to the restaurant so that the driver can place an order or make a reservation. Alternatively, the driver may express direct disinterest in the relevant content. Disinterest may be interpreted in several ways. The driver 504 may ignore the relevant content. The driver 504 may appear agitated by the relevant content. The driver 504 may verbally reject the offer. The driver 504 may appear confused by the relevant content. In any event, the driver's response, or lack thereof, is noted by the sensor 502 and provided to the system controller 506 and that information is used to remember and learn the driver's preferences.

Figure 6B:
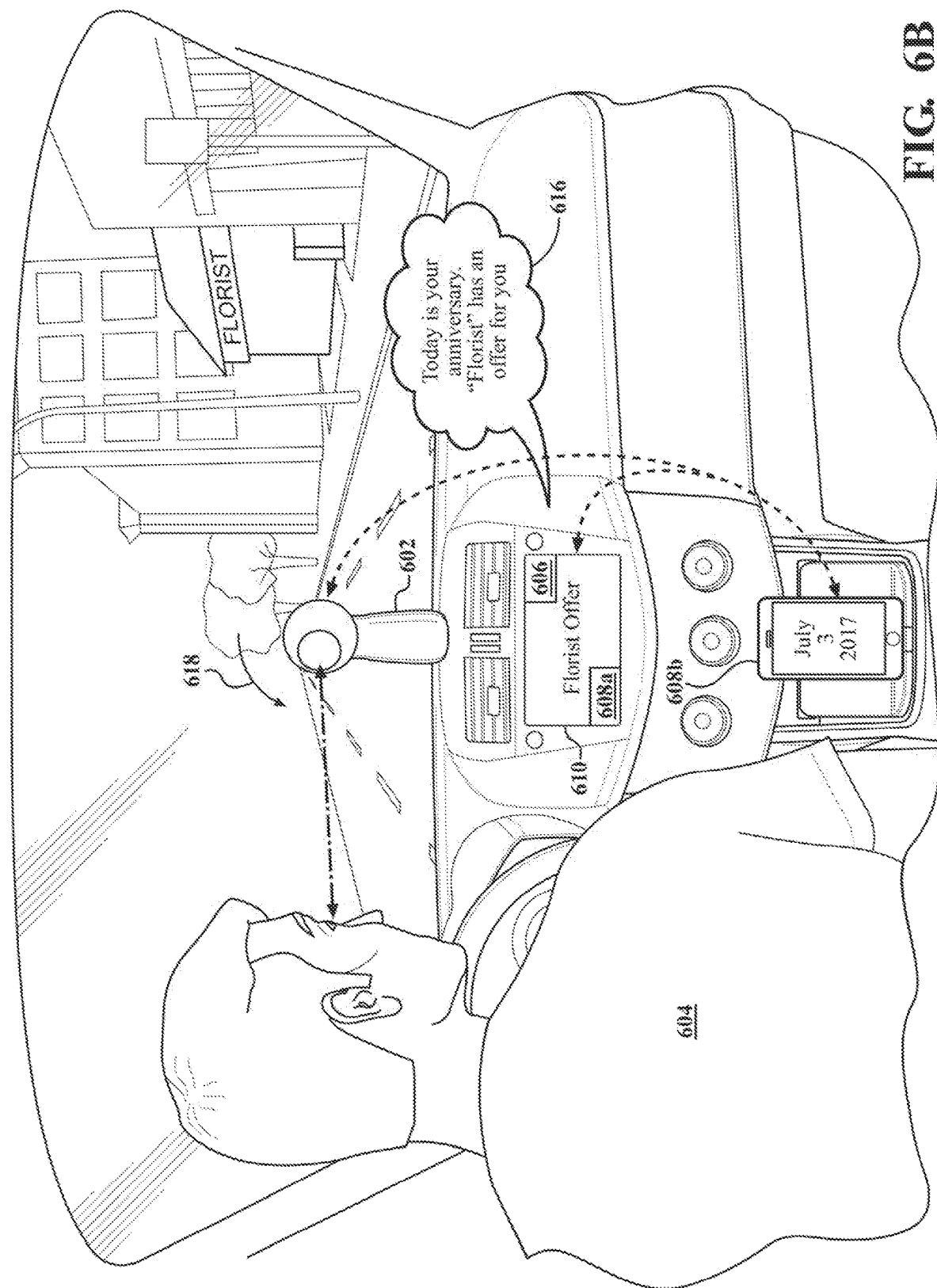

In another example is shown with reference to FIGS. 6A-6C. Referring to FIG. 6A, the mobile phone connection 608b may include the driver's calendar information which includes appointments, birthday information, anniversary information etc. The rotatably-mounted sensor 602 may collect information about the driver's upcoming wedding anniversary, for example. The rotatably-mounted sensor 602 may also collect information about a florist by detecting a storefront in the vicinity of the driver. The rotatably-mounted sensor 602 collects information about a special on bouquets being offered by the florist recognized by the rotatably-mounted sensor 602 scanning the area in its field of view or gleaning the points-of-interest from a GPS/Navigation device.

Referring now to FIG. 6B, the system controller 606 receives all of this information and is able to process the information to control the rotatably-mounted sensor in a manner that first rotates the rotatably-mounted sensor in a direction 618 that captures the driver's attention. Referring to FIG. 6C, the controller 606 rotates the rotatably-mounted sensor 602 in a direction 620 of the florist, drawing the driver's attention to the storefront. The sensor may be controlled to present the driver with a reminder 616 of the upcoming anniversary, a notification of the offer presented by the nearby florist, and the opportunity to contact the florist and place an order for a bouquet. The driver may express interest or disinterest, as a verbal command 622 for example, in the offer.

Figure 7A:
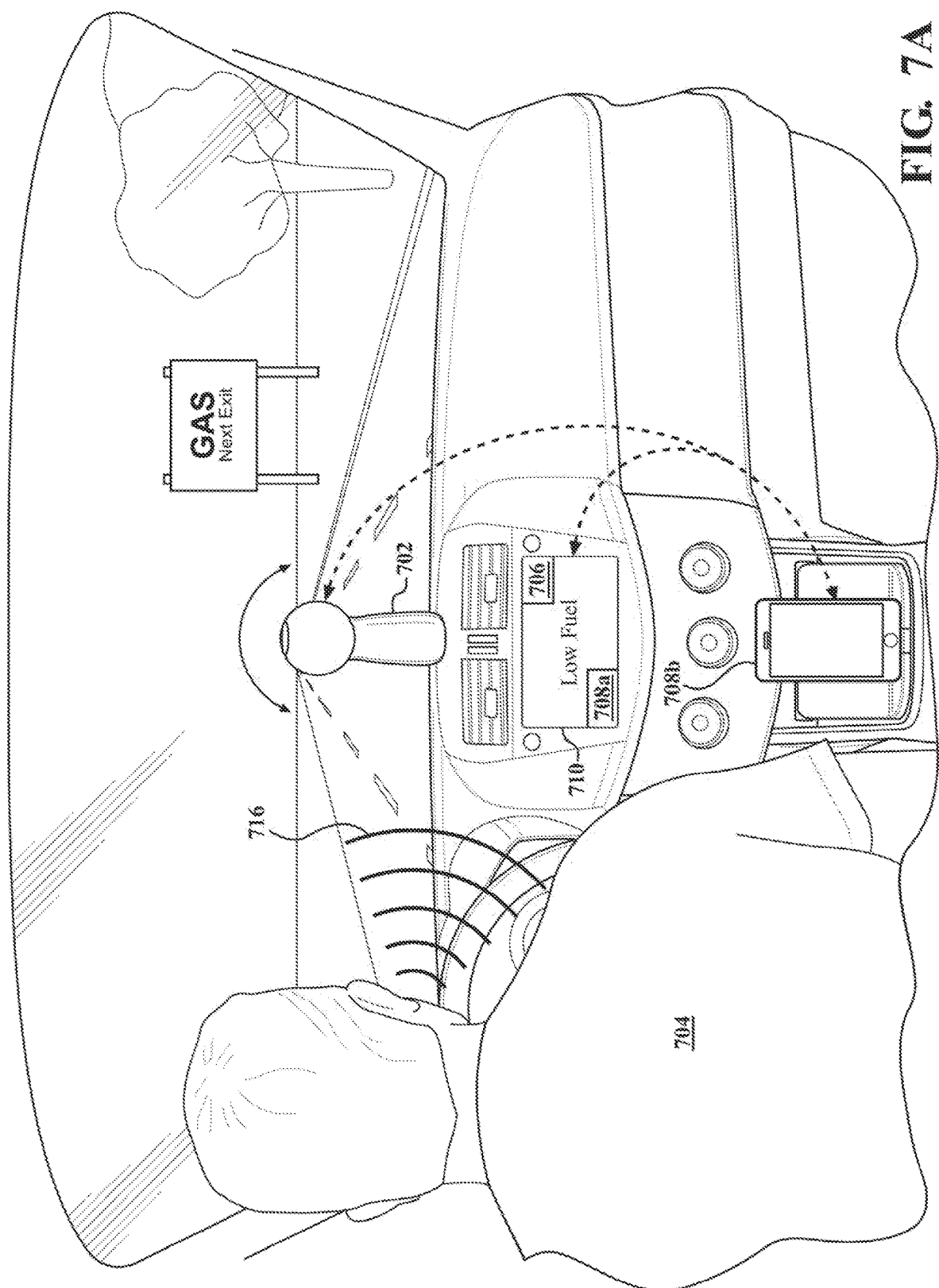
Figure 7B:
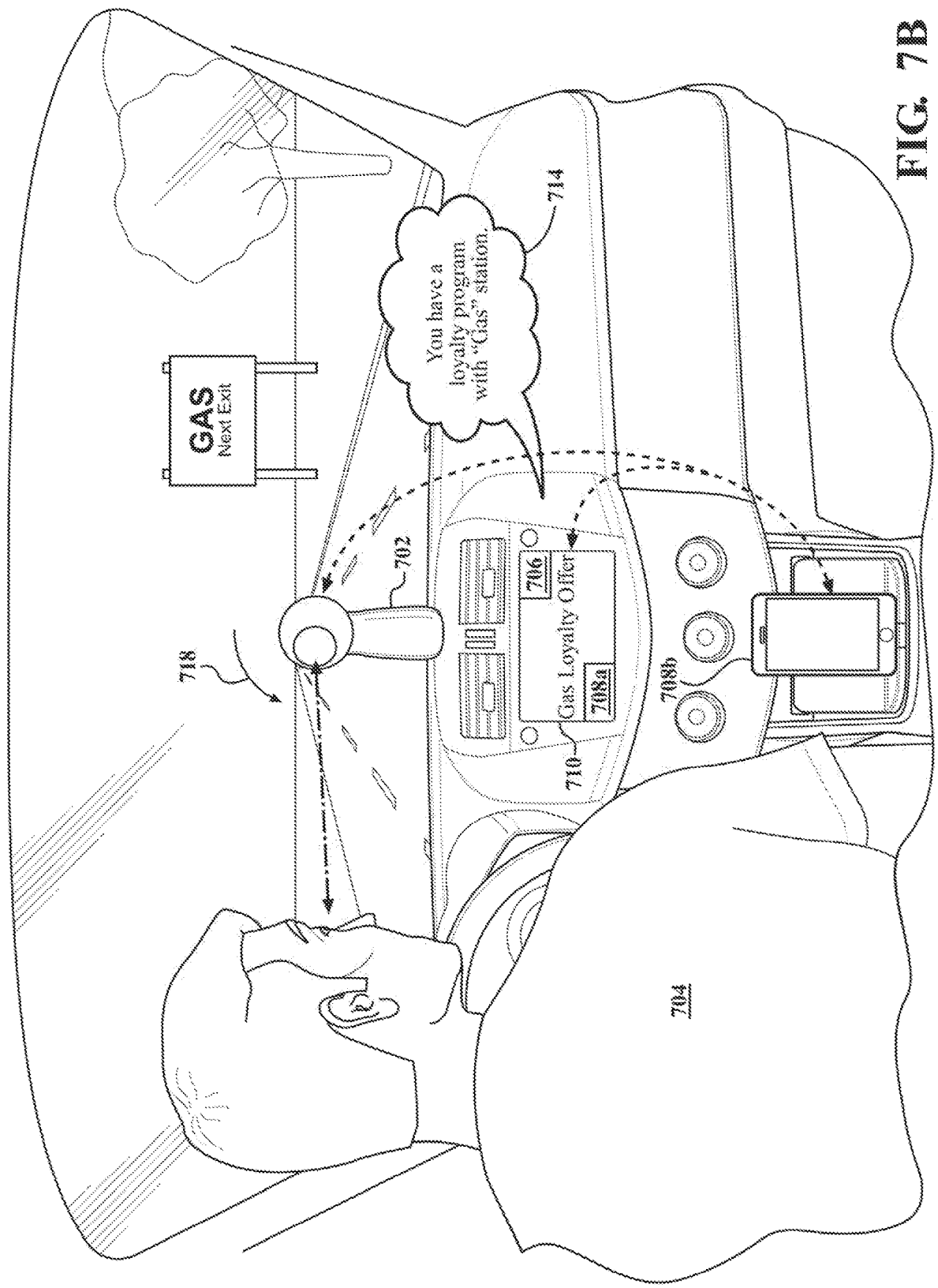

It is also possible for the driver to instruct the rotatably-mounted sensor, through verbal command for example, to "look out" for a particular need of the driver. For example, as described with reference to FIG. 7A, the driver 704 wants to stop to refuel. The driver 704 can issue a verbal request 716 for the rotatably-mounted sensor to "look out" for gas stations, such as through microphones and speakers that are associated with the infotainment system 710 and the system controller 706. The rotatably-mounted sensor 702, utilizing its camera-based technology and/or the GPS/Navigation information, searches for a nearby gas station, and communicates the relevant data to the system controller 706. Referring now to FIG. 7B, upon recognizing a gas station, the rotatably-mounted sensor 702 sends the information to the system controller 706, which processes the data and outputs a command to rotate the rotatably-mounted sensor in a direction 718 that attracts the driver's gaze to the rotatably-mounted sensor and presents an offer 714 to the driver. Referring to FIG. 7C, the system controller 706 then rotates the sensor 702 in a direction 720 that draws the driver's attention to the nearby gas station. In this regard, the driver can maintain focus on the task of safely driving the vehicle, while the rotatably-mounted sensor 702 does the work of searching, identifying and directing the driver to the nearest gas station. Additionally, an audio message 714 may be presented to the driver to indicate the location of the upcoming gas station.

In each of the examples presented herein, there is a potential for Out of Home (OOH) advertisers, such as billboards, signs, etc., to receive benefits usually associated only with digital advertising media. The ability to present an advertisement and receive immediate feedback from the driver about its effectiveness via the rotatably-mounted sensor and system controller of the inventive subject matter allows the advertiser to infer useful information from the driver's feedback. For example, the driver's response to the advertisement, or lack thereof, the time that lapses before the driver responds, are something advertisers do not normally get from OOH advertisements. A fixed, physical billboard, typically a passive advertisement, now has the capability of being linked to a system that triggers an event once the billboard is within view of the rotatably-mounted sensor.

The determination of which gas station to present to the driver may be based on its proximity to the driver in addition to information about the current level in the tank, the amount of time the driver has already been on the road, and any loyalty programs that the driver may be associated with for different gas stations. All of this information is taken into account by the system controller when determining relevant content and selecting relevant content to be presented to the driver. The feedback from previous interaction with the driver is also used in algorithms associated with the system controller to customize and optimize the presentation of relevant content to the driver.

A potential for generating advertising revenue for service providers (i.e., the infotainment provider and/or the Original Equipment Manufacturers) from relevant content that is determined, selected and presented to the driver is provided by the system and method described herein. Referring to FIG. 8, an exemplary method 800 describing vendor relationships with the service provider to the system and method described herein is presented. Vendors and/or advertisers create a relationship 802 with either the vehicle infotainment system provider or vehicle manufacturer, or both, for the market channel for advertising presented by the rotatably-mounted sensor system described herein. A vendor may pay to have their offers stored and selected for presentation to the driver. Paid advertisements that are presented 806 to the vehicle occupant under terms of the vendor relationships may be deemed high-priority relevant content when determining and selecting relevant content to present to the driver. The in-vehicle system described herein presents a market channel for out-of-home-to-digital advertising using enhanced location-based services presented by the system and method described herein.

The vendors create advertisement offers to be presented through the rotatably-mounted sensor 804. The sensor will first rotate to subtly attract the driver's attention to the sensor and then rotate in a direction of the offer to subtly attract the driver's attention to the offer, which may be a sign or store, in the sensor's line of sight. For example, drawing the driver's attention to the upcoming florist as described in FIGS. 8A-C when the sensor recognizes that the driver's anniversary is approaching. Alternatively, or additionally, the advertisement offer may be presented to the driver through a visual such as a billboard, as an audible message through the vehicle's audio system, as a visual message on an in-vehicle display or mobile device, as a multimedia message played through the vehicle infotainment system, etc. or a combination of one or more of the methods. The advertisement offers are available, as discussed above, and communicated 806 to the rotatably-mounted sensor for presentation to the driver (or other vehicle occupant) through the rotatably-mounted sensor.

In the event a vehicle occupant accepts the offer 808, and the offer is actually used in commerce 810, the method allows for vendors to pay the service provider 812 (such as the OEM) for the successful advertising method, thereby generating advertising revenue for the service provider. In addition to the benefit of generated advertising revenue for the service provider, the vendor also benefits in that the vendor is able to communicate with the sensor and track the effectiveness of the digital marketing channel presented by the system and method described herein.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. Additionally, the components and/or elements recited in any system claims may be assembled or otherwise operationally configured in a variety of permutations and are accordingly not limited to the specific configuration recited in the claims.

The system and method described herein is directed to a vehicle and an occupant in a vehicle. However, the system and method can also be incorporated into a portable devices used by a pedestrian or cyclist. The computer logic and/or computer processor can be incorporated into a dedicated housing or it may be incorporated into a mobile phone, tablet, the rotatably-mounted sensor, the system controller, or other portable computing device.

The aspects described herein may be a system, a method, and/or a computer program product. The computer program product may include a computer readable storage medium having computer readable program instructions for causing a processor to carry out steps and elements of the inventive subject matter. The computer readable storage medium may be, but is not limited to, an electronic storage device, a magnetic storage device, an optical storage device, an electromagnetic storage device, a semi-conductor storage device, or any suitable combination thereof.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A method for presenting advertisements within a vehicle, the method comprising:
    storing, in a database, advertisements to be presented to a vehicle occupant;
    setting a context for the vehicle occupant;
    determining relevant advertisements based on the context and the stored advertisements;
    selecting relevant advertisements to be presented to the vehicle occupant; and
    presenting the relevant advertisements by rotating a sensor rotatably mounted in the vehicle, the rotatably-mounted sensor is rotated in a first direction that captures a gaze of the vehicle occupant and the rotatably-mounted sensor is rotated in a second direction that draws the gaze of the vehicle occupant in a direction of the relevant advertisement.

2. The method as claimed in claim 1 further comprising the steps of:
    detecting a reaction of the vehicle occupant;
    determining an interest of the vehicle occupant based on the detected reaction; and
    storing the interest of the vehicle occupant for application to the step of determining relevant advertisements of selecting relevant advertisements.

3. The method as claimed in claim 1 wherein the step of setting a context for the vehicle occupant further comprises using data and information collected from the rotatably-mounted sensor.

4. The method as claimed in claim 1 wherein the step of setting a context for the vehicle occupant further comprises using data and information collected from one or more systems or devices in the vehicle selected from a mobile device associated with the vehicle occupant, an infotainment system in the vehicle, a navigation system associated with the mobile device, a navigation system associated with the infotainment system, a command from the vehicle occupant, a database, a source external to the vehicle that is capable of communicating with one or more systems or devices within the vehicle.

5. The method as claimed in claim 2 wherein the step of setting a context for the vehicle occupant further comprises the steps of:
    detecting a reaction of the vehicle occupant;
    determining an interest of the vehicle occupant based on the detected reaction; and
    storing the interest of the vehicle occupant for application to the step of determining relevant advertisements of selecting relevant advertisements.

6. The method as claimed in claim 5 wherein the step of detecting a reaction of the vehicle occupant further comprises one or more of determining a facial expression of the vehicle occupant, interpreting a verbal response of the vehicle occupant, or sensing a lack of reaction from the vehicle occupant.

7. The method as claimed in claim 1 wherein the step of storing advertisements further comprises storing a link to digital media that is triggered by the step of selecting relevant advertisements.

8. The method as claimed in claim 1 further comprising the steps of:
    establishing an advertising revenue relationship between a service provider and a vendor;
    creating a customized offer to be presented to a vehicle occupant by the service provider; and
    upon the vehicle occupant accepting the offer and using the offer in commerce, the vendor submits advertising revenue to the service provider.

9. The method as claimed in claim 8 further comprising the step of tracking an effectiveness of the customized offer based on advertising revenue paid to the service provider.

* * * * *